April 10, 1951         J. P. MORRIS         2,548,440
FILTER
Filed Aug. 10, 1949
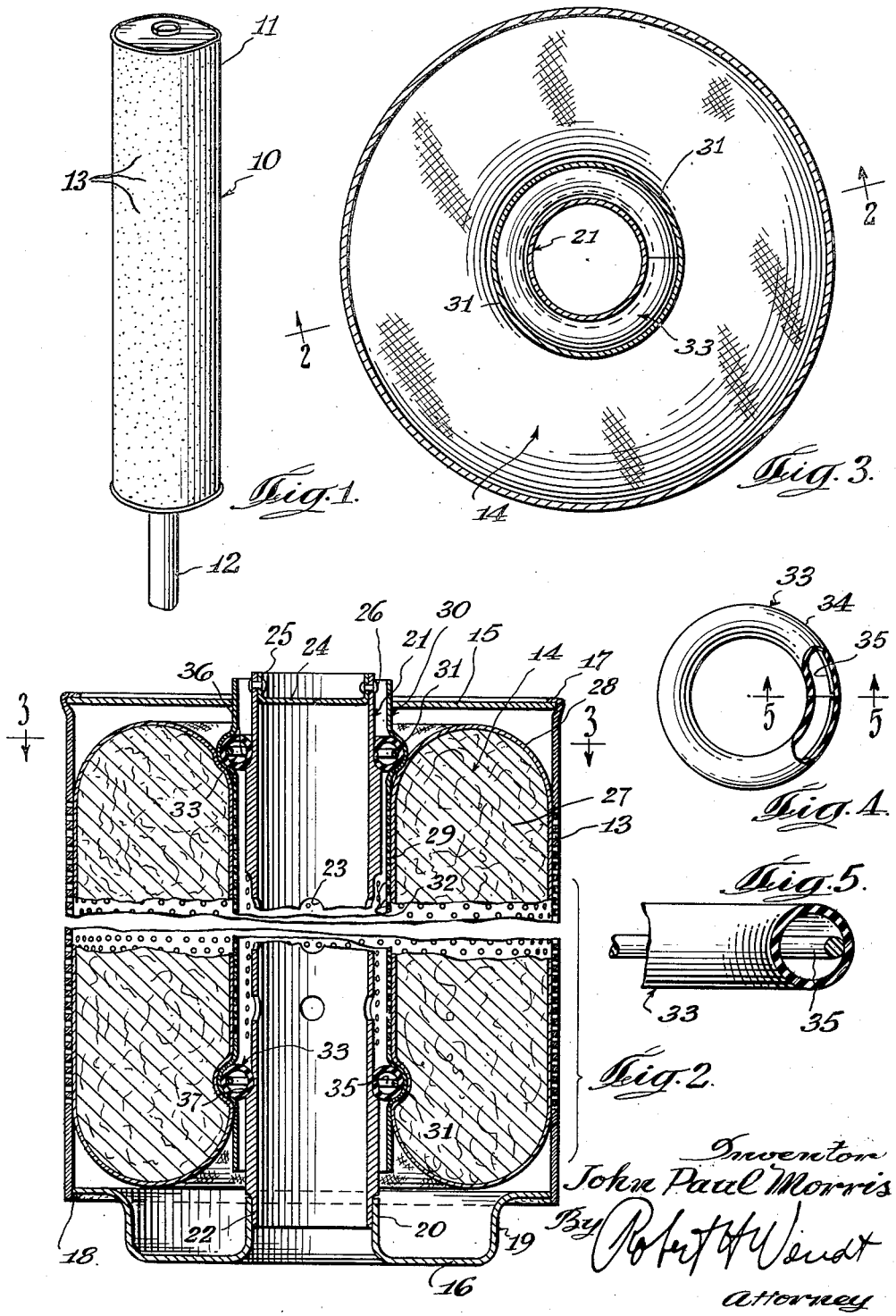
Inventor
John Paul Morris
By Robert H. Wendt
Attorney Patented Apr. 10, 1951

2,548,440

UNITED STATES PATENT OFFICE 2,548,440

FILTER

John Paul Morris, Hinsdale, Ill., assignor to M & J Diesel Locomotive Filter Corporation, Chicago, Ill., a corporation of Illinois Application August 10, 1949, Serial No. 109,556

2 Claims. (Cl. 210—154)

The present invention relates to filters, and is particularly concerned with a type of filter which is used for filtering the fuel used with Diesel engines.

One of the objects of the invention is the provision of an improved filter which is simple in structure, durable, and which is adapted to be manufactured at a low cost.

Another object is the provision of an improved filter in which the replaceable unit is capable of being assembled with the housing and standpipe that are used with it, with a minimum amount of labor and inconvenience, and in which there is positive assurance that the liquid will not by-pass the filter by leakage between the standpipe and the tube supporting the filter unit.

Another object of the invention is the provision of an improved filter combination employing an improved type of seal which is expandible to form a liquid-tight seal between the standpipe and the filter supporting tube, but which is so compressible that by the application of an axial force it is possible to pull the filter unit and its supporting tube off the standpipe, the seal rotating and acting as a roller until it passes off the standpipe, and the seal itself compressing to pass any obstructions on the standpipe.

Another object of the invention is the provision of an improved filter seal which is durable and resilient and which is reinforced by a resilient metal member in such manner that it always expands into sealing position, both inwardly and outwardly, to engage a standpipe and a filter tube, yet it is sufficiently compressible to permit its removal by passing between two smaller annular spaces between these two members without damage to the seal.

Other objects and advantages of the invention will be apparent from the following description and the accompanying drawings, in which similar characters of reference indicate similar parts throughout the several views.

Referring to the single sheet of drawings accompanying the specification:

Fig. 1 is a view in perspective of a filter assembly mounted upon a filtrate tube;

Fig. 2 is an axial cross-sectional view taken through the filter of Fig. 1, which is broken away intermediate its length to show that it may be made of any length, the middle portions of all lengths being the same;

Fig. 3 is a horizontal sectional view taken on the plane of the line 3—3 of Fig. 2, looking in the direction of the arrows;

Fig. 4 is a plan view of one of the filter seals, broken away to show its internal structure;

Fig. 5 is an enlarged cross-sectional view taken on the plane of the line 5—5 of Fig. 4, looking in the direction of the arrows.

Referring to Figs. 1-3, 10 indicates in its entirety the filter assembly, which preferably includes an outer filter housing 11 and a suction tube 12. The housing 10 consists of a cylindrical metal member made of any suitable metal, such as steel, which is provided with a multiplicity of relatively small apertures or perforations 13 in its side wall for access of the liquid to be filtered to the element 14.

The cylindrical housing 13 is provided at each of its ends with annular metal members 15 and 16 secured permanently in the wall 13 by having the wall spun over at 17 or 18. The annular end member 16 is formed with an annular offset at 19 and with an inwardly extending tubular portion 20 for supporting a standpipe 21.

The standpipe 21 comprises a metal tube which may be made of steel, having a reduced portion 22 fitting on the tube 20, where it is permanently secured, and having a plurality of relatively large apertures 23 throughout its length for passing the filtrate.

The upper end of the standpipe 21 (Fig. 2) is closed by means of a cap 24, the cylindrical flange 25 of which is secured by rivets 26 in the end of the tube 21. The lower end of standpipe 21 (Fig. 2) is open and slidably receives the suction pipe 12 of Fig. 1.

The filter element 14 comprises a mass of cotton waste, including cotton threads extending in all random directions to form an elongated thick tubular member, the waste being indicated at 27. The waste is contained in a knit, stretchable cotton sock 28, which extends over the outside of the waste and downward inside the tubular mass of waste, as indicated at 29, on the inside of the sock, where it is tied with suitable drawstrings on a filter tube 30.

The filter tube 30 preferably has a plurality of circumferentially extending, partially circular ribs 31; and on the inside of the tube these ribs form circular grooves. The ribs 31 may be located at regularly spaced points longitudinally of the tube 30, which tube also has a multiplicity of relatively fine apertures 32 for passing the filtrate from the filter element 27 into the standpipe 21.

The size of the thick tubular mass 27 of cotton waste which is enclosed in the sock 28 is such that it has a substantial fit in the container 11, utilizing all of the space therein.

Adjacent each end of the tube 30, which supports the filter element 14, one of the ribs 31 is employed for receiving a seal of the type indicated at 33 and shown in Fig. 4. This seal consists of a resilient cylindrical tube 34 of rubber, or preferably of a resilient composition, such as neoprene, which resists deterioration by oil.

The tube 34 is long enough so that it makes a toroid that will fit inside the grooves of the ribs 31 when slightly compressed. For example, in a seal the actual size of which is shown in Fig. 2, the size of the seal may be such as to have an inside diameter one eighth of an inch less than the outside of the standpipe 21 and an outside diameter one-eighth of an inch larger than the inside of the groove at the rib 31.

The tube 34 has its ends in abutting relation to form a ring; and it also contains a resilient circular wire spring 35 of sufficient size to be received within the ring 33 when used as a seal. The wire spring 35 tends to expand outward into the groove of the ribs 31, and tends to hold the seal in the grooves. One such seal is preferably provided adjacent each end of the ribbed tube 30.

The seal at the open end or the upper end of Fig. 2 positively prevents the by-passing of the filter element 14, which might otherwise occur in the space between the tubes 21 and 30. The lower seal in Fig. 2 prevents oil to be filtered from going around the lower end of the filter element 14 and thus by-passing the filter element.

Thus all of the oil to be filtered has to pass in radially through the holes 13, through the filter element 14, through the holes 32, and through the holes 23 into the standpipe 21.

When a new filter element is to be provided, the resiliency of the seal members 33 is such that they may roll along the two tubes until the tube 30 with its filter element 14 has been moved endwise off the standpipe 21.

The standpipe 21 is preferably formed with an annular shoulder at 36 and another at 37 for engaging the two seals 33 and supporting the filter element on the standpipe.

It will thus be observed that I have invented an improved filter combination including a pair of resilient seals that resiliently engage in grooves in a tube supporting the filter element and resiliently engage an annular shoulder on the standpipe to effect a positive seal against the passage of liquid.

These sealing members permit one tube to be removed from the other by the rolling action of the seals, during which they may be compressed sufficiently to permit this motion, yet the seals are capable of expanding enough to prevent positively the liquid from by-passing the filter element. The use of a resilient wire inside the tube gives a wide degree of radial expansion, and the use of a resilient tube on the resilient wire permits the seal itself to expand in size or to compress into minimum size whenever necessary.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a filter assembly, the combination of a perforated standpipe unit with a permanently assembled filter unit, said standpipe unit comprising a tubular metal member of substantially cylindrical shape having thickened wall portions adjacent each end and a thinner portion intermediate said thickened portions and said thinner portion being provided with a multiplicity of apertures, and having one end open and the other end closed, with a sheet metal cap secured in the end, the said thickened portions terminating in a partially circular annular retaining shoulder facing toward the closed end in each instance, for receiving a seal, the said filter unit comprising an outer cylindrical housing provided with a multiplicity of apertures, a pair of circular end members permanently secured to the ends of said cylindrical member, one of said circular members comprising a flat disc having a central aperture, and the other of said circular members comprising a dished annular member having a central aperture bordered by an inwardly extending tubular member slidably receiving said standpipe, a filter tube in said aperture in said disc, said tube comprising a tubular metal member formed with a pair of partially circular annular ribs projecting outwardly and forming inwardly open annular grooves of circular cross section located in substantial registry with said annular shoulders, said filter tube being perforated in the area between said annular ribs, and said filter tube being coaxially located with respect to said standpipe, a filter element in said cylindrical casing and comprising an annular body of waste housed inwardly and outwardly by a stretchable sock, and a pair of sealing members of toroidal shape, the said sealing members rolling on said standpipe during the insertion of the standpipe, and permitting a limited sliding until the standpipe is inserted in the aperture in the dished member and the seals are located in the annular grooves and against the annular shoulders of the standpipe.

2. In a filter assembly, the combination of a perforated standpipe unit with a permanently assembled filter unit, said standpipe unit comprising a tubular metal member of substantially cylindrical shape having thickened wall portions adjacent each end and a thinner portion intermediate said thickened portions and said thinner portion being provided with a multiplicty of apertures, and having one end open and the other end closed, with a sheet metal cap secured in the end, the said thickened portions terminating in a partially circular annular retaining shoulder facing toward the closed end in each instance, for receiving a seal, the said filter unit comprising an outer cylindrical housing provided with a multiplicity of apertures, a pair of circular end members permanently secured to the ends of said cylindrical member, one of said circular members comprising a flat disc having a central aperture, and the other of said circular members comprising a dished annular member having a central aperture bordered by an inwardly extending tubular member slidably receiving said standpipe, a filter tube in said aperture in said disc, said tube comprising a tubular metal member formed with a pair of partially circular annular ribs projecting outwardly and forming inwardly open annular grooves of circular cross section located in substantial registry with said annular shoulders, said filter tube being perforated in the area between said annular ribs, and said filter tube being coaxially located with respect to said standpipe, a filter element in said cylindrical casing and comprising an annular body of waste housed inwardly and outwardly by a stretchable sock, and a pair of sealing members of toroidal shape, the said sealing members rolling on said standpipe during the insertion of the standpipe, and permitting a limited sliding until the standpipe is inserted in the aperture in the dished member and the seals are located in the annular grooves and against the annular shoulders of the standpipe, each of said seals comprising a resilient tubular member having its ends in abutting relation to form a toroid and housing a resilient metal wire adapted to permit expansion or contraction of the toroid to accommodate the seals to smaller size for anstallation and expansion into larger size when installed.

JOHN PAUL MORRIS.

REFERENCES CITED

The following references are of record in the file of this patent:

UNITED STATES PATENTS

| Number | Name | Date |
| --- | --- | --- |
| 207,871 | Horton | Sept. 10, 1878 |
| 668,501 | Davis | Feb. 19, 1901 |
| 2,367,745 | Wicks | Jan. 23, 1945 |
| 2,487,659 | Lockheed | Nov. 8, 1949 |